April 30, 1946.  A. CROT  2,399,326
PRESSURE RELIEF VALVE
Filed June 24, 1943
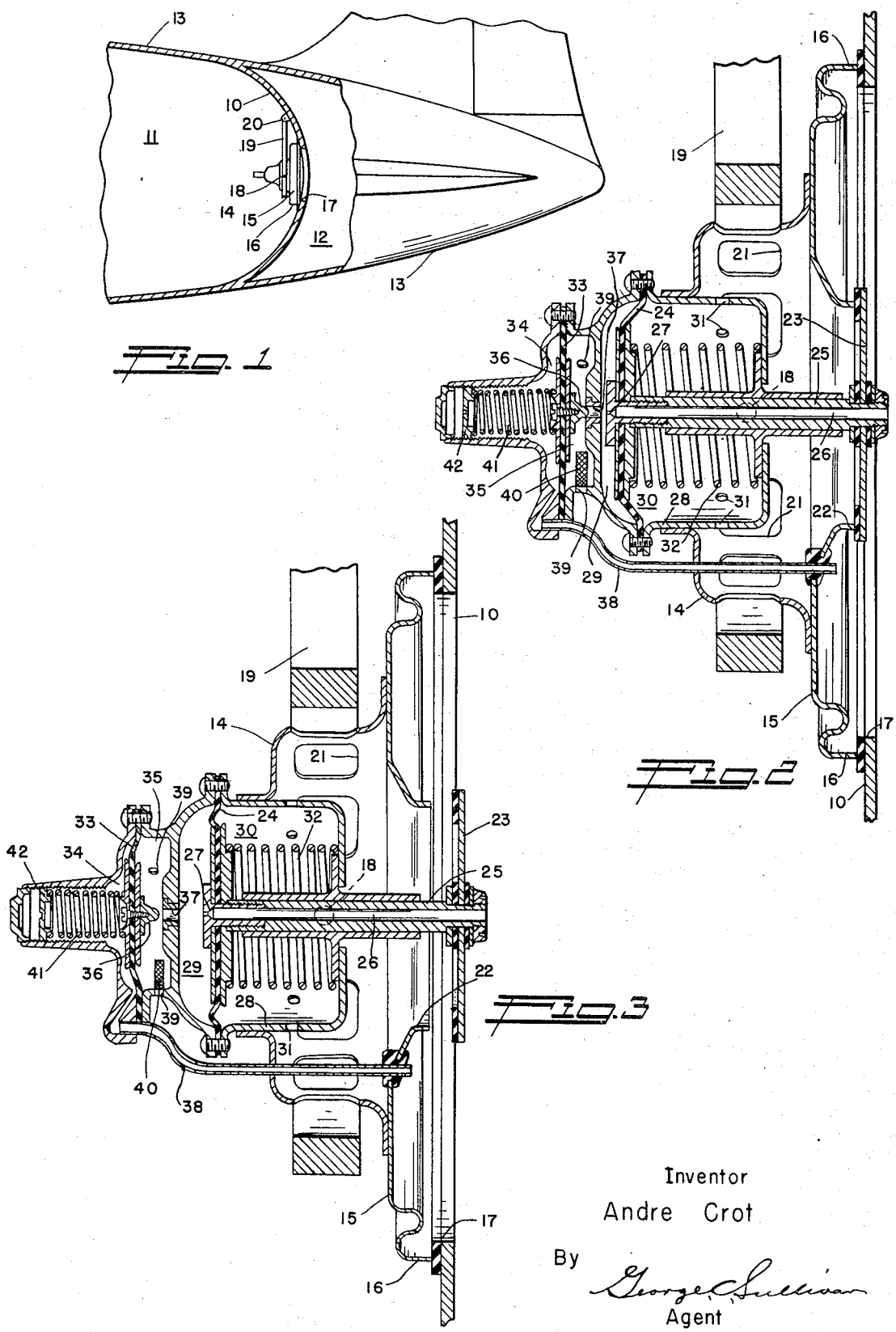
Inventor
Andre Crot
By
George Sullivan
Agent Patented Apr. 30, 1946

2,399,326

UNITED STATES PATENT OFFICE 2,399,326

PRESSURE RELIEF VALVE

André Crot, Topanga, Calif., assignor to Lockheed Aircraft Corporation, Burbank, Calif.

Application June 24, 1943, Serial No. 492,147

8 Claims. (Cl. 98—1.5)

This invention relates to an improved positive and negative pressure relief valve particularly adapted for the supercharged cabins of aircraft intended to operate at high altitudes, wherein structural limitations of the cabin shell set a limiting positive pressure differential between the interior of the cabin and the atmosphere, and operating conditions require that the cabin pressure must never fall below the outside atmosphere, as might happen on a quick descent from a high altitude.

The present invention is intended to be an emergency safety valve distinct from and independent of the cabin supercharging and pressure regulating mechanism. As an example of the latter, reference is made to the N. C. Price Patent No. 2,342,220, granted February 22, 1944, entitled "Pressure control system," wherein the pressure control operates to release air from the cabin to produce, maintain, or regulate a positive differential pressure within the cabin as related to the surrounding atmosphere, this positive pressure varying from zero at the altitude of the airport to a maximum pressure differential at high altitudes, and being regulatable in flight to return the cabin pressure differential to zero during the approach to a landing field at a different barometric pressure from that at the field at which the flight originated. It will be evident that such cabin supercharging systems must provide for the release of all positive pressure within the cabin before the sealed cabin can be opened, and it is also necessary that provision be made to release excess pressures, above the designed pressure differential, to protect the cabin from bursting in the event the cabin supercharging controls fail to limit the differential pressure rise in the cabin. It will be noted that if a sealed and leakproof cabin is carried up to high altitudes the external pressure falls with the altitude and therefore imposes an increasingly positive pressure differential within the cabin even though the absolute pressure within the cabin remains constant. Thus, when a cabin is designed to withstand a positive internal pressure of say five pounds, this means a pressure differential between the inside and outside of that amount, the outside pressure decreasing with altitude, so that the internal cabin pressure must be reduced to maintain the limiting design differential. Also, in the event of a descent from a high altitude the normal controls may fail to increase the internal pressure with sufficient rapidity to equalize inside and outside pressure upon landing, so that it is an object of this invention to provide an improved and simplified emergency or safety relief valve adapted to both sensitively limit the differential pressure to a predetermined maximum, and to prevent the development of negative differential pressures within the cabin. Thus the valve of this invention is double acting in that it is intended to open both to relieve excessive positive pressure differentials, and to prevent the cabin pressure from dropping below that of the external atmospheric pressure.

While my invention, as disclosed herein, was primarily developed for pressurized aircraft cabins, it will be evident that it is equally suitable for controlling and limiting the pressure range within any pressurized enclosure, such as a room maintained under slight pressure to prevent the infiltration of dust, to exclude noxious gases, or to retain a special gas, as a hydrogen or other gaseous envelope in a furnace.

It will also be evident that a mere reversal of the valve relative to the closure wall will serve to maintain a selected negative pressure differential in the closure in the event such an arrangement is desired.

Other and further important objects of this invention will be apparent from the disclosures in the specification and the accompanying drawing.

This invention in its prefered form is illustrated in the drawing and hereinafter more fully described.

On the drawing:

Figure 1 is a fragmentary showing, partly in section, of an airplane fuselage having a pressure compartment terminating in a bulkhead carrying an emergency relief valve embodying the features of this invention.

Figure 2 is a central section through the relief valve of this invention, shown in its closed position.

Figure 3 is a section similar to Figure 2 showing the relief valve opened to relieve excessive pressure in the airplane.

As shown—

I have chosen to illustrate my invention as mounted in a transverse semi-spherical bulkhead 10 separating a pressurized compartment 11 from an unpressurized area 12 in the tail section of an airplane fuselage 13. By arranging the relief valve of this invention in such an internal bulkhead the valve will be protected from icing troubles due to expansion and consequent cooling of the moisture laden released air. It will be understood, of course, that this location is a matter of choice and convenience, and the valve could be located elsewhere if it were desired to include the tail section of the fuselage in the pressurized area, as might well be the case if a tail gunner's station were provided at this point.

The illustrated form of my invention is intended as a safety valve to prevent excess positive pressure differentials in the cabin and to prevent the creation of negative pressures therein at any time. Normally, the pressurization or supercharging of the cabin is the function of a mechanism that controls the pressure and/or delivery and/or release of air from the pressurized area, the present invention being independent thereof in that it is designed to function when the normal controls fail for any reason to maintain the pressure within the designed positive differential pressure range, my invention being operative at both extremes of the designed range of the normal pressurizing equipment, details of which are unnecessary to the understanding of the present invention.

The relief valve chosen for illustrative purposes is intended to open inwardly under negative pressures and outwardly under excessive positive pressures, and comprises a housing 14 supporting a radial annular disc 15 having a peripheral flange 16 forming a valve which seats against a gasket surrounding an opening 17 in the bulkhead, the housing being pivotally balanced on pins 18 in a frame 19 in turn pivotally suspended at 20 from the bulkhead. This arrangement forms a pendulum or flap valve and the only force acting to hold it seated in an internal positive pressure within the compartment 11, the slightest negative pressure unseating the valve to admit outside air to the compartment. The housing 14 has a series of apertures 21 to provide unrestricted air flow through the opening 22 in the center of the disc 15 when an outwardly opening valve disc 23 is open, as shown in Figure 3.

The valve 23 is under the control of a flexible diaphragm 24 connected thereto by a valve stem 25 passaged at 26 and having a restricted orifice 27 in said passage. The diaphragm 24 is mounted in a casing 28 which defines chambers 29 and 30 above and below the diaphragm. The passage 26 and orifice 27 in the valve stem admit outside air pressure to the upper chamber 29, and cabin air pressure is admitted to the lower chamber 30 through ports 31 in the wall of the casing 28. A spring 32 is also provided in the lower chamber to provide a supplementary closing force on the valve 23. Thus under normal conditions the valve 23 is held to its seat by the spring 32. When the outside and cabin pressures are identical the valve 23 is held closed by spring pressure, and as a positive pressure is created in the cabin the pressure differential is balanced out, since the higher cabin pressure acts outwardly against the area of the valve disc 23 and inwardly against the lower side of the diaphragm 24, the two surfaces having approximately equal areas. Also, as the cabin pressure differential increases, due to a fall in the outside pressure, the lowered pressure in the chamber 29 above the diaphragm is balanced by the same pressure acting inwardly against the outer face of the valve disc 23. The spring 32 is thus the sole seating force for the valve 23, and is chosen merely to assure a good tight seat against its gasket within the working range of pressure, and to compensate for slight working or distortion of the disc 15, and is non-critical in that a wide variation in the spring rate becomes permissible, as would not be the case if the spring were relied upon to allow the valve to open at a predetermined pressure.

A pilot valve mechanism is provided to actually operate the valve 23 at the desired limiting pressure differential. This mechanism comprises a pilot diaphragm 33 located between upper and lower chambers 34 and 35 in an extension of the casing 28, which diaphragm carries a central boss 36 normally sealing a port 37 opening into the upper chamber 29 of the main diaphragm 24. The pilot diaphragm 33 is subjected to outside atmospheric pressure in the upper chamber 34 through a tube 38, and to cabin pressure in the lower chamber 35 through ports 39 in the walls thereof, which ports are preferably screened as indicated at 40. Since the cabin pressure is intended to vary on the positive side only, the tendency of the pilot diaphragm 33 is to move upwardly, uncovering the port 37 and admitting the higher pressure cabin air above the main diaphragm. Since this pressure is greater than the outside pressure acting through the valve stem and orifice 27 it tends to escape outwardly through the restricted orifice, so that a substantial positive working pressure is necessary to overbalance such flow through the orifice, and to also compress the spring 32 to open the valve 23.

Opening movement of the pilot diaphragm is opposed by a calibrated spring 41 backed by an adjustable stop 42. This spring is finely adjustable as to load, and determines the permissible positive pressure differential. This spring is in effect preloaded and also out of phase with the operation of the main diaphragm and valve 23, as the pilot diaphragm has to open the port 37 a substantial amount before sufficient pressure can be built up in the chamber 29 to overcome the spring 32, because of leakage through the orifice 27. Thus the pilot diaphragm control has very sensitive control characteristics wherein both the opening and closing of the relief valve 23 can be accurately adjusted to a predetermined maximum pressure differential, maintaining an extremely narrow pressure range over a wide range of air flows through the valve 23.

As the cabin pressure drops due to opening of the relief valve 23, the pilot valve closes and the relief valve starts to close. Because of the restricted orifice 27, the air above the main diaphragm 24 escapes slowly through the valve stem thus damping and retarding the closing of the relief valve 23. This damping action of the relief valve 23 reduces the motoring or hunting tendency of the valve, as well as the range of pressure variation between opening and closing motions, and also prevents hammering of the valve 23 on its seat.

As an example, a 2½ inch diameter valve, designed to vent a maximum flow of 250 cubic feet per minute at a pressure differential of approximately five pounds to the square inch, utilized a main spring 32 loaded to approximately 10 plus or minus 3 pounds, the spring rate approximating 6 pounds to the inch. This spring was selected to secure an adequate seal between the valve 23 and its seat, and spring variations within the limits indicated did not affect the sensitivity of the valve. The size of the orifice 27 was found to be an optimum at .028″ diameter (#70 drill), as a small hole made the valve sensitive on opening movements, while a larger hole permitted rapid closing but was not sensitive to opening. With this arrangement very sensitive control characteristics were obtained as the valve could maintain a pressure differential on the order of one percent of that desired, which, in the case of the particular supercharged cabin for which the valve was designed, ranged from 4 to 6 pounds per square inch as set at the pilot diaphragm spring adjustment.

It will thus be seen that I have invented an improved and simplified relief valve of the type described, adapted both to prevent the development of negative pressures and to give a sensitive control of a preselected maximum positive pressure differential.

Having thus described my invention and the present preferred embodiments thereof, I desire to emphasize the fact that many modifications may be resorted to in a manner limited only by a just interpretation of the following claims.

I claim as my invention:

1. A double acting relief valve for an enclosure comprising a valve body having a centrally passaged valve disc cooperating with an opening in said enclosure to form an inlet valve, means for supporting said valve body and disc for inward swinging movement relative to the opening in the enclosure, a positive pressure relief valve supported in said valve body and adapted to seat in the central passage in said valve disc for outward opening movement relative thereto, a diaphragm chamber in said valve body, a diaphragm therein exposed to the pressure within said enclosure on the relief valve side thereof whereby to seat said valve, a passaged valve stem connecting said diaphragm to said relief valve, the said passage in said valve stem having a restricted orifice extending through the diaphragm and in communication with the atmosphere surrounding said enclosure, whereby said orifice provides a restricted bleed from the diaphragm chamber above or inwardly of the diaphragm therein, and a pilot valve mechanism comprising a pilot diaphragm, a valve carried on one side thereof for controlling the admission of pressure from the enclosure to the first mentioned diaphragm chamber above the diaphragm therein, means admitting external air to the opposite side of said pilot diaphragm, and adjustable spring means loading said pilot diaphragm in a direction to close the valve carried thereby whereby to adjust the pressure responsiveness of said pilot valve mechanism.

2. A double acting relief valve for an enclosure comprising a valve body having a centrally passaged valve disc cooperating with an opening in said enclosure to form an inlet valve, means for supporting said valve body and disc for inward swinging movement relative to the opening in the enclosure, a positive pressure relief valve supported in said valve body and adapted to seat in the central passage in said valve disc for outward opening movement relative thereto, a diaphragm chamber in said valve body, a diaphragm therein exposed to the pressure within said enclosure on the relief valve side thereof, a spring loading said diaphragm whereby to seat said valve, a passaged valve stem connecting said diaphragm to said relief valve, the said passage in said valve stem having a restricted orifice extending through the diaphragm and in communication with the atmosphere surrounding said enclosure, whereby said orifice provides a restricted bleed from the diaphragm chamber above or inwardly of the diaphragm therein, and a pilot valve mechanism comprising a pilot diaphragm, a valve carried on one side thereof for controlling the admission of pressure from the enclosure to the first mentioned diaphragm chamber above the diaphragm therein, means admitting external air to the opposite side of said pilot diaphragm, and adjustable spring means loading said pilot diaphragm in a direction to close the valve carried thereby whereby to adjust the pressure responsiveness of said pilot valve mechanism.

3. A pressure relief valve for a closed compartment, comprising an outwardly opening valve, and a diaphragm type pilot valve for energizing said outwardly opening valve in response to a predetermined limiting positive pressure differential, the diaphragm of said pilot valve being responsive to the differential between the inside and outside pressures, a calibrated and adjustable spring acting on the outside pressure side of said diaphragm whereby to determine the positive pressure differential at which the pilot valve opens, in combination with an inwardly opening valve the moving parts of which are associated with said outwardly opening valve for movement therewith, and means for supporting said movable parts and outwardly opening valve for inward opening movement in response to negative pressure differentials.

4. A pressure compartment relief valve, comprising an outwardly opening valve, pneumatic operating means for said outwardly opening valve including a restricted orifice forming a bleed from the opening side of the valve operating means to the external atmosphere, and a diaphragm type pilot valve for energizing said outwardly valve in response to a predetermined limiting positive pressure differential in said pressure compartment, in combination with an inwardly opening valve the moving parts of which are associated with said outwardly opening valve for movement therewith, and means for supporting said movable parts and outwardly opening valve for inward opening movement in response to negative pressure differentials within the pressure compartment.

5. A pressure cabin relief valve for a closed compartment, comprising an outwardly opening valve, pneumatic operating means for said outwardly opening valve including a restricted orifice forming a bleed from the opening side of the valve operating means to the external atmosphere, and a diaphragm type pilot valve for energizing said outwardly valve in response to a predetermined limiting positive pressure differential in said pressure cabin, the diaphragm of said pilot valve being responsive to the differential between the cabin and outside pressures, a calibrated and adjustable spring acting on the outside pressure side of said diaphragm whereby to determine the positive pressure differential at which the pilot valve opens, in combination with an inwardly opening valve the moving parts of which are associated with said outwardly opening valve for movement therewith, and means for supporting said movable parts and outwardly opening valve for inward opening movement in response to negative pressure differentials within the pressure cabin.

6. A pressure cabin relief valve, comprising an outwardly opening valve, pneumatic operating means for said outwardly opening valve including a restricted orifice forming a bleed from the opening side of the valve operating means to the external atmosphere, and a pilot valve for energizing said outwardly valve in response to a predetermined limiting positive pressure differential in said pressure cabin, in combination with an inwardly opening valve the moving parts of which are supported by said outwardly opening valve for movement therewith, and means for supporting said movable parts and outwardly opening valve for inward opening movement in response to negative pressure differentials within the pressure cabin.

7. A differential pressurized compartment relief valve comprising a pressure operated valve controlling an opening in the wall of said compartment, a diaphragm operatively connected to said valve, means subjecting opposite sides of said diaphragm to the pressure within and without said compartment respectively, one of said means including a restricted orifice forming a bleed from the valve opening side of said diaphragm, a pilot valve for admitting energizing pressure to the valve opening side of said diaphragm whereby to open said first mentioned valve when the volume of flow of the energizing pressure exceeds the capacity of the bleed through said orifice and thereby builds up a differential pressure sufficient to energize the valve opening movement of said diaphragm, and means for supporting said valve structure for bodily opening upon a reversal of the pressures inside and outside the pressurized compartment.

8. A relief valve for a pressurized closure of the type described, comprising an outwardly opening valve, pneumatically responsive means connected to said valve for operating the same, means for transmitting closure pressures to one side of said pneumatically responsive means in a direction to normally cause a closing movement of said valve, means providing a restricted communication to external pressure from the opposite side of said pneumatically responsive means, means for also transmitting closure pressure to the said opposite side of said pneumatically responsive means, a diaphragm and a valve operated thereby for controlling said last mentioned means, and means for subjecting said diaphragm to the differential of pressures inside and outside of the closure.

ANDRÉ CROT.